Oct. 13, 1925.
J. SUTTON
HARROW
Filed Oct. 13, 1924
1,557,383
2 Sheets-Sheet 2
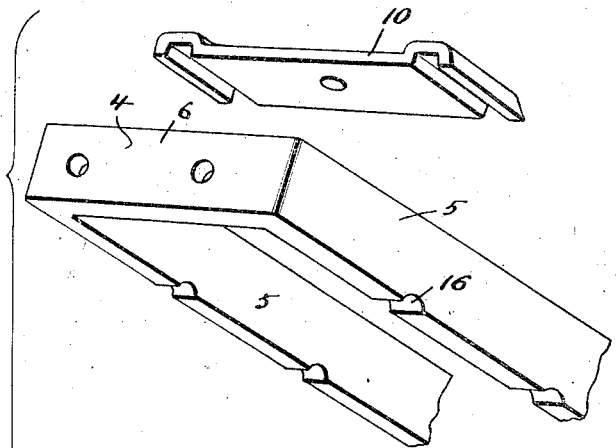
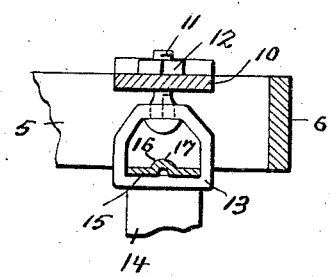
Jesse Sutton INVENTOR Patented Oct. 13, 1925.

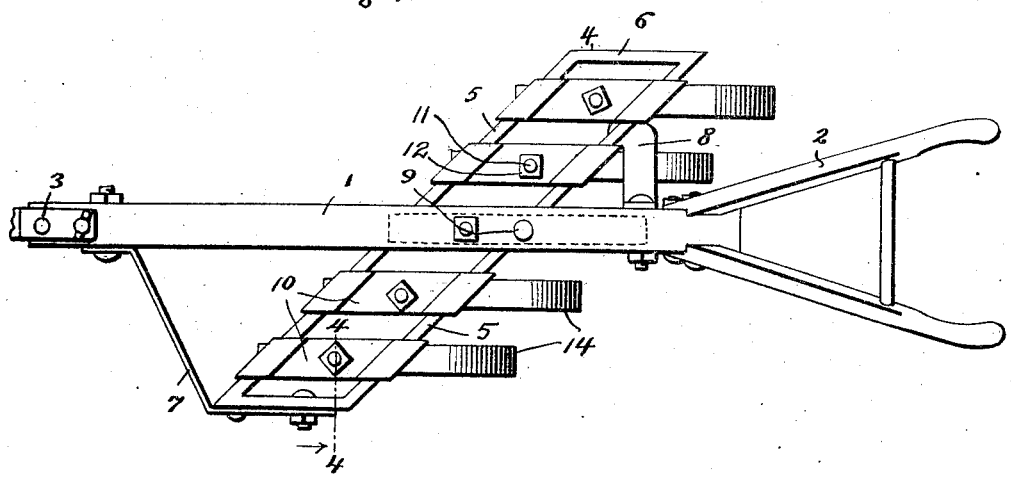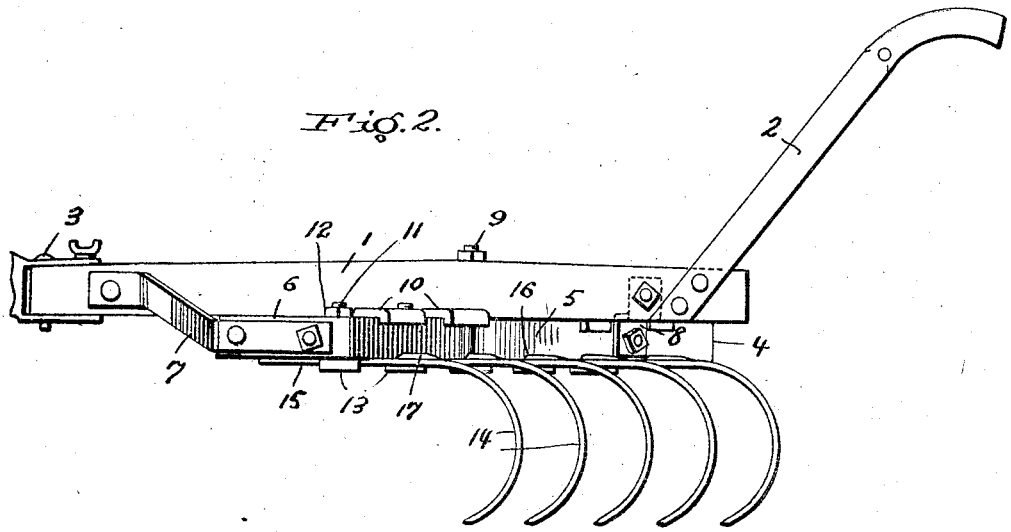

1,557,383

UNITED STATES PATENT OFFICE.

JESSE SUTTON, OF SILVER CREEK, MISSISSIPPI.

HARROW.

Application filed October 13, 1924. Serial No. 743,358.

*To all whom it may concern:*

Be it known that I, JESSE SUTTON, a citizen of the United States, residing at Silver Creek, in the county of Lawrence and State of Mississippi, have invented new and useful Improvements in Harrows, of which the following is a specification.

This invention relates to improvements in harrows, the general object of the invention being to provide simple means for removably holding the spring teeth of the harrow in position.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of the complete device.

Figure 2 is a side view thereof.

Figure 3 is a perspective view showing certain parts of the device separated.

Figure 4 is a section on line 4—4 of Figure 1.

In these views, 1 indicates a beam of ordinary construction to which the usual handles 2 are connected at one end and the clevis 3 at the other end. A frame 4 composed of side bars 5 and end bars 6 is fastened to the beam by the braces 7 and 8 and by the bolts 9. The frame is inclinedly arranged on the beam, as shown and it carries a number of cross pieces 10 on its upper part which have their ends mitered to engage the side bars of the frame. These pieces extend parallel with the beam. Each piece carries a bolt 11 which is held in place by a nut 12 and a yoke 13 is carried by each bolt 11 and the bolt 9, this bolt 9 being of considerable length. The spring teeth 14 have their shanks 15 passing through the yokes 13 and these shanks also engage the lower edges of the side bars 5 which are provided with notches 16 to receive ribs or projections 17 formed on the shanks. Thus by tightening the nuts 12 on the bolts the yokes 13 are drawn upwardly and thus the shanks of the teeth are clamped against the frame, turning movement being prevented by the ribs 17 engaging the notches 16.

It will thus be seen that I have provided simple and inexpensive means for forming a spring toothed harrow on an ordinary plow beam, the teeth of which are firmly held in place but can be removed when desired. There is no danger of the teeth getting out of proper spaced relation and new teeth can be easily and quickly inserted when the old ones break or become worn.

One of the important features of this harrow is that the angle in which the teeth lie can be changed by adjusting the teeth forwardly or rearwardly in the frame 4 and this can be done without changing the space between the teeth. The space between the teeth can also be changed without altering the angle.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a beam, a frame fastened to the lower edge thereof, said frame being composed of inclinedly arranged side bars and end bars connecting the side bars together, cross pieces on the frame arranged parallel to the beam, bolts carried by the cross pieces, a yoke carried by each bolt, teeth having their shanks passing through the yokes and resting against the lower edges of the side bars.

2. A device of the class described comprising a beam, a frame fastened to the lower edge thereof, said frame being composed of inclinedly arranged side bars and end bars connecting the side bars together, cross pieces on the frame arranged parallel to the beam, bolts carried by the cross pieces, a yoke carried by each bolt, teeth having their shanks passing through the yokes and resting against the lower edges of the side bars, the lower edges of the side bars having notches therein and the shanks of the teeth having projections thereon for engaging the notches.

In testimony whereof I affix my signature.

JESSE SUTTON.